Figure 1:
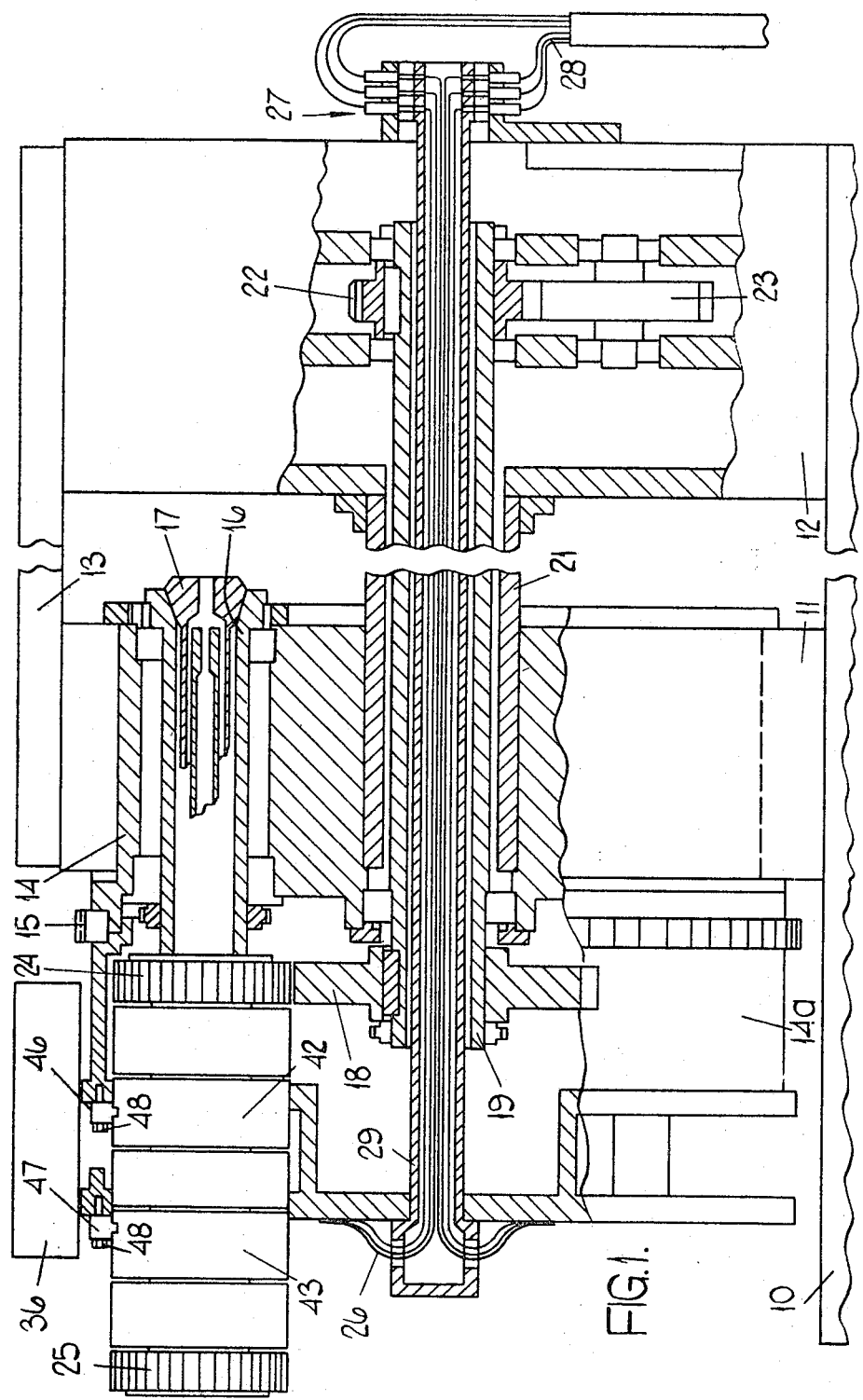

United States Patent [19]

McConnell et al.

[11] 4,290,514

[45] Sep. 22, 1981

[54] CLUTCH PROTECTION DEVICE

[75] Inventors: Edmund A. McConnell, Coventry; Norman Yearsley, Kenilworth; Alec G. Blockley, Coventry, all of England

[73] Assignee: Wickman Machine Tool Sales Limited, Coventry, England

[21] Appl. No.: 62,376

[22] Filed: Jul. 31, 1979

Related U.S. Application Data

[63] Continuation of Ser. No. 852,399, Nov. 17, 1977, abandoned.

[51] Int. Cl.³ .............................................. F16D 66/00
[52] U.S. Cl. .............................. 192/30 W; 188/1.11; 192/84 C; 340/52 A
[58] Field of Search ............ 192/30 W, 18 B, 84 AA, 192/84 C; 188/1 A; 340/52 A

[56] References Cited

U.S. PATENT DOCUMENTS

| | | | |
|---|---|---|---|
| 2,057,876 | 10/1936 | Berry | 192/30 W |
| 2,323,489 | 7/1943 | Schmidt et al. | 192/30 W |
| 2,816,454 | 12/1957 | Hosea et al. | 192/84 AA X |
| 2,848,085 | 8/1958 | Mannaioni | 192/18 B X |
| 3,363,232 | 1/1968 | Mizsak | 340/52 A |
| 3,456,236 | 7/1969 | Labartino et al. | 340/52 A |
| 3,735,343 | 5/1973 | Lane et al. | 340/52 A |
| 4,079,820 | 3/1978 | Mattli | 192/84 C |
| 4,175,650 | 11/1979 | Miller | 192/84 C |

FOREIGN PATENT DOCUMENTS 1134433 12/1956 France .
2362307 8/1976 France .

*Primary Examiner*—Allan D. Herrmann
*Attorney, Agent, or Firm*—Ladas & Parry

[57] ABSTRACT

A clutch or brake protection device for use with a clutch having relatively axially movable components, the device including an element mounted on one of the components and situated adjacent to the other of the components, the position of the element being such that it will contact the said other component when wear in the clutch or brake in excess of a predetermined amount has taken place, to complete electrical connection and provide a signal indicating the condition of the clutch or brake.

1 Claim, 7 Drawing Figures

CLUTCH PROTECTION DEVICE

This is a continuation of prior application Ser. No. 852,399 filed Nov. 17, 1977 and now abandoned.

This invention relates to electrically actuated friction type clutches or brakes, referred to generally as clutches, for coupling together parts, between which relative rotation can take place, to cause them to rotate together or to act as a brake for one of the parts relatively to the other. Apparatus in which such clutches may be used include lathes and in particular though not exclusively, multi-spindle automatic lathes.

It is the object of the invention to provide a clutch protection device which ensures that wear on the interengaging components of the clutch does not go unnoticed, to the detriment of the clutch and other parts of the apparatus.

According to the invention there is provided a clutch protection device for a clutch having two relatively axially movable components comprising an element mounted upon one of the components and situated adjacent to the other of said components, the position of said element in relation to said other component being such that, upon wear taking place in the clutch in excess of a predetermined amount, the element will make contact with said other component, to complete a circuit associated with a signal producing means.

Figure 2:
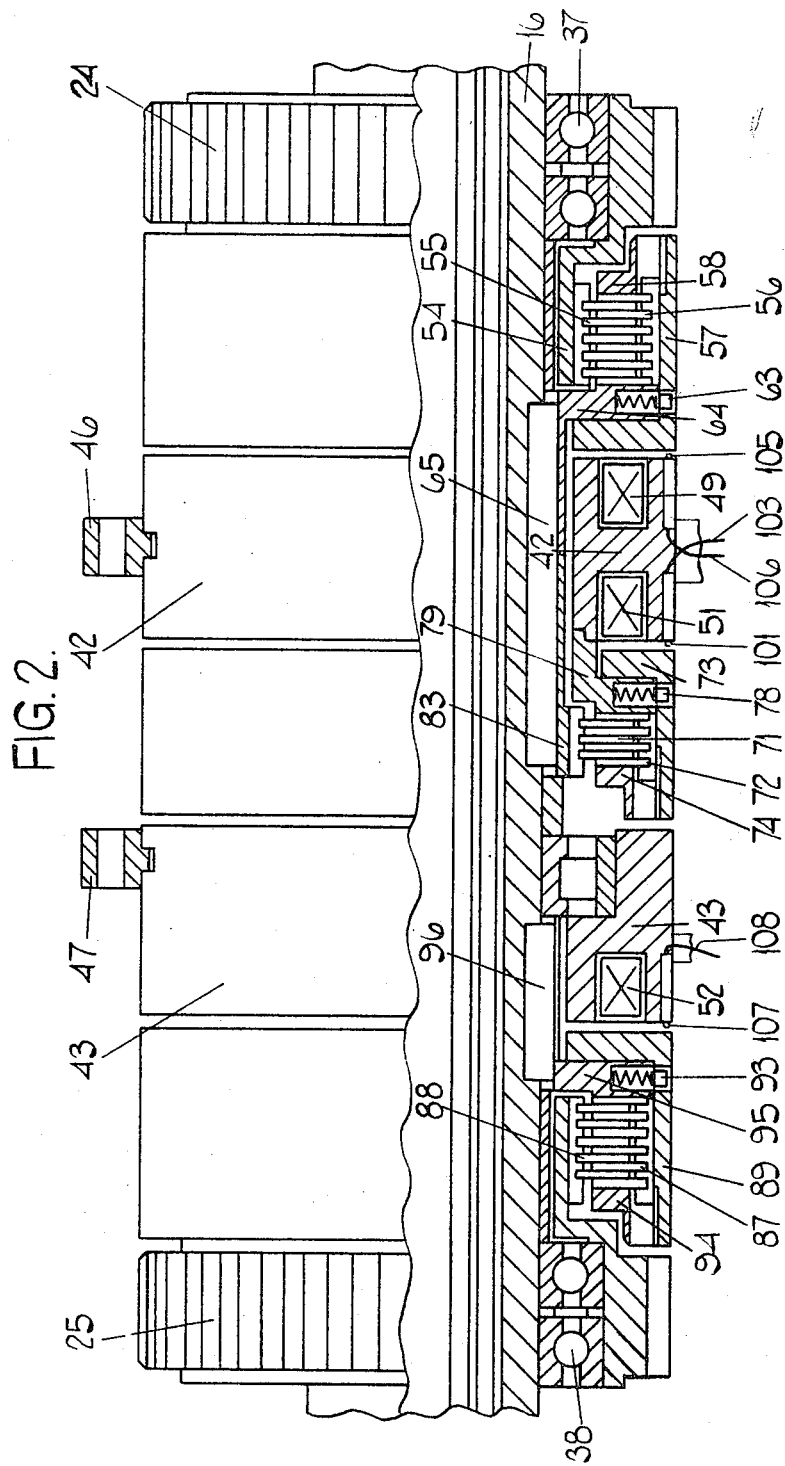
Figure 3:
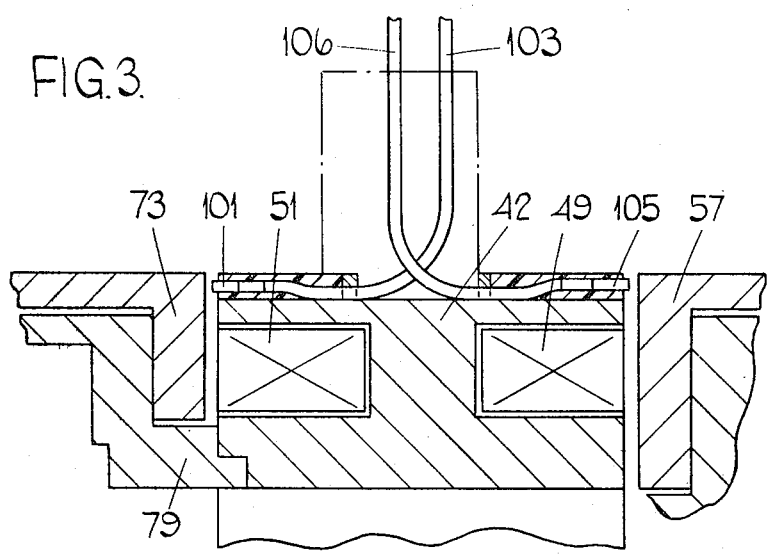
Figure 4:
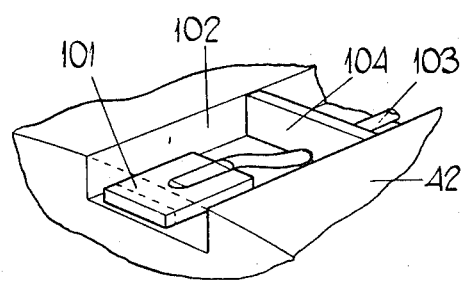
Figure 5:
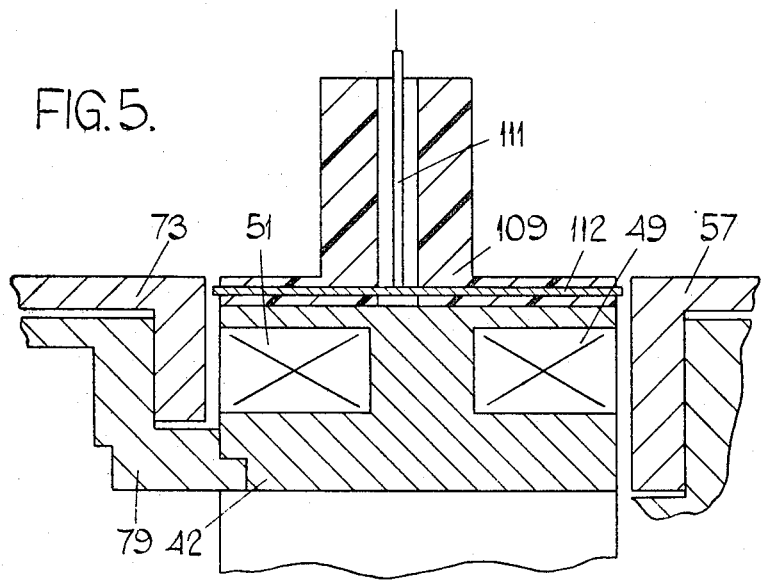
Figure 6A:
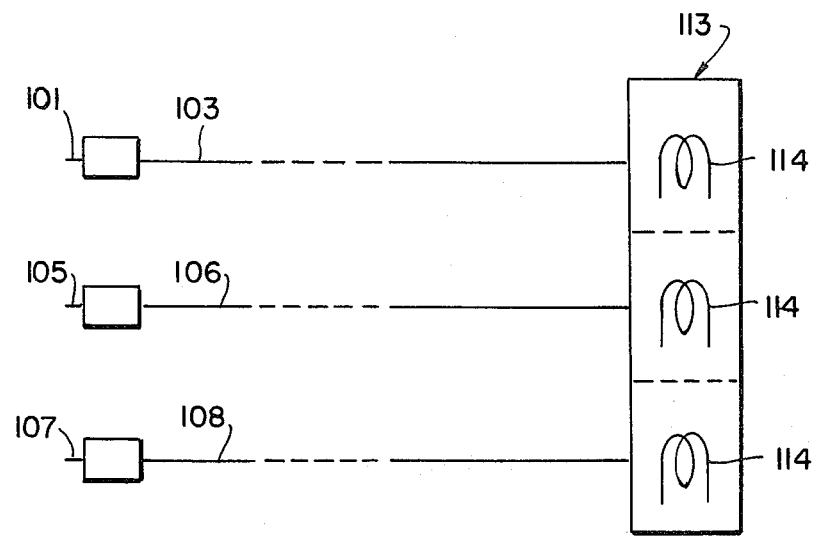
Figure 6B:
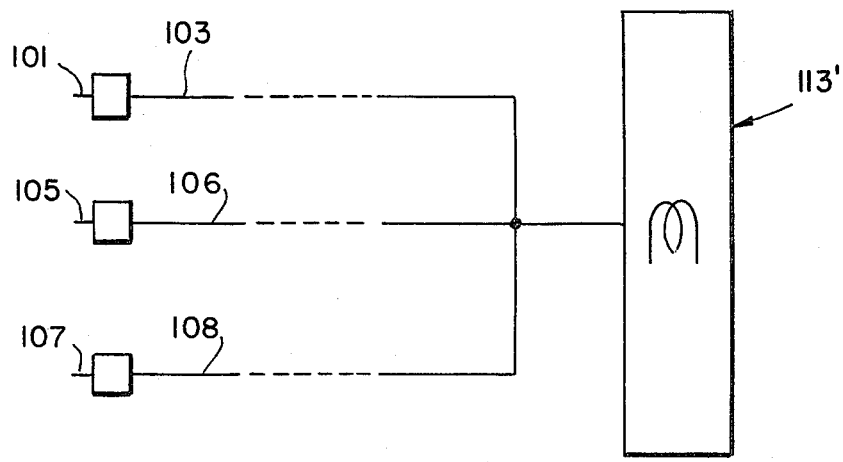

The invention will now be described by way of example with reference to the accompanying drawings in which, FIG. 1 is a part sectional view of a multi-spindle lathe incorporating the invention, FIG. 2 is an enlarged part sectional view of one of the spindle drive mechanisms of the lathe, FIG. 3 is a still further enlarged sectional view of part of the drive mechanism showing the invention, FIG. 4 is a fragmentary perspective view of parts shown in FIG. 3, FIG. 5 is an enlarged sectional view of part of the drive mechanism showing an alternative arrangement, and FIGS. 6(a) and 6(b) illustrate diagrammatically two forms which the connections to the signal means might take.

FIG. 1 illustrates a lathe comprising a base 10 on which are mounted two housings 11 and 12. These are connected by an overhead bridge 13.

In the housing 11 is mounted a spindle drum 14 having a rearward extension 14a. Between the drum 14 and its extension 14a there is mounted an external gear ring 15 which engages with a gear (not shown) whereby the drum and the extension are together indexed.

Mounted in the drum 14 are a plurality of work spindles, one of which is shown at 16. These are journalled in the drum for rotation and they are disposed about a pitch circle on which the centre coincides with the centre of the drum. Each such spindle has a releasable chuck of which the jaws are indicated at 17.

Each work spindle has an associated drive mechanism whereby it can be rotated at two alternative speeds and each such drive mechanism also incorporates a brake. These components are further described in relation to FIG. 2.

For rotating the drive mechanisms and hence the spindles 16, there is a gear 18 enclosed within the drum extension 14a and mounted on the rear end of a shaft 19 passing through the centre of the drum and being coaxial therewith. This shaft 19 extends right through both housings 11 and 12 and it is enshrouded in a tube 21 extending through the drum 14 and connected to the adjacent face of the housing 12.

Carried on the end of the shaft 19 within the housing 12, is a gear 22 meshing with a gear 23. The gear 23 is driven from a motor (not illustrated). Thus, drive through the gears 23, 22 rotates the shaft 19 and through the gear 18 this drives each of the drive mechanisms of the work spindles 16. Such drive takes place through a gear 24 on each spindle drive mechanism. However, alternative speed of rotation of the work spindles can be obtained by driving through a gear 23 on each drive mechanism. This takes place through a gear train (not illustrated) also having originating drive from the central shaft 19.

Extending through the interior of the shaft 19, which is tubular, is an inner tube 29 fixed at one end to the drum extension 14a. Through this extends wiring 26 which leads to the respective work spindles as will be described. At the other end of the machine, that is on the face of the housing 12, remote from the drum 14 there is an electrical distributor indicated generally at 27. This provides electrical connection between the wiring 26 within the inner tube 29 which is thus rotating when the drum rotates and stationary wiring 28 which is connected with power supply means (not illustrated).

A distribution box 36 mounted on the drum extension 14a provides for electrical distribution between the respective drive mechanisms for the work spindles 16.

Referring to FIG. 2 this illustrates on an enlarged scale the drive mechanism of one of the spindles. The spindle 16 itself is a hollow tube on which the gears 24 and 25 are journalled through bearings 37, 38.

Clutch coil rings forming part of the drive mechanism are mounted on spindle drum extension 14a through clamps 46, 47 secured to the drum extension by bolts 48, these being shown in FIG. 1. These clamps engage respective rings 42, 43 surrounding the spindle 16, and the clamps 46, 47 secure these in non-rotatable manner to the spindle drum extension 14a.

The ring 42 contains a pair of electro-magnetic coils 49, 51 and the ring 43 contains a further electro-magnetic coil 32.

To connect the gear 24 to the spindle 16 there is a clutch comprising a sleeve 64 which is non-rotatably secured to the spindle 16 by a key 65. This sleeve 64 has an outwardly directed flange in which is a spring loaded catch 63. Engaged by the catch is an armature in the form of a flanged collar 57. The sleeve 64 engages with a plurality of clutch plates 56. Interleaved with the clutch plates 56 are further clutch plates 55 engaging an extension 54 of the gear 24.

An adjustment ring 58 forms a back-up for the clutch plates 55, 56 and is used to adjust the air gap between the armature 57 and coil 49.

Engagement is accomplished by energising the electro-magnetic coil 49 which thus attracts the armature 57 to which the adjustment ring 58 is engaged by means of a screw thread.

This compresses the clutch plates and frictional engagement between them creates a driving connection between the spindle 16 and the gear 24.

De-energisation of the coil 49 allows the clutch plates 55, 56 to separate. Though not illustrated there are springs to separate these plates the springs acting between the armature 57 and the flange of member 64.

To connect the gear 25 with the shaft 16, there is a further clutch including a sleeve 95 engaged with the spindle 16 by a key 96. The flange of this contains a spring loaded plunger 93 engaging with a part 89. The sleeve 95 engages clutch plates 87 with which are interleaved further clutch plates 88 engaging an extension of the gear 25. An adjusting member 94 engages within the member 89 by means of a screw thread and this operates in exactly the same way as the clutch first described in relation to the gear 24 by energisation of the electro-magnetic coil 52.

It is also possible to stop the spindle 16 by actuating a brake which is operated by means of the electro-magnetic coil 51. The mechanism of the brake is similar to the clutches already described. Engaged by the key 65 is a sleeve 83 which directly engages one set of clutch plates 71. Interleaved with these are clutch plates 72 engaging a member 79 which is non-rotatably engaged through the spring loaded plunger 78 with a part 73. Member 79 is fixed to the ring 42 in which the electro-magnetic coil 51 is situated. A further adjusting ring 74 is provided engaged in the member 73 for adjusting the clearance of the clutch plates 71, 72.

When the electro-magnetic coil 51 is energised to stop the spindle 16, the member 73 is attracted towards the coil 51 thus compressing the plates 71, 72 together so that the spindle 16 is brought to rest. The clutch for engaging drive through the gear 25 is actuated in similar manner by energising the coil 52.

It is necessary for the drive mechanism to be inspected at regular intervals to ensure that clutch and brake adjustments are correct but it sometimes happens that such maintenance is not carried out as frequently as it should be.

Provision is therefore made for excessive wear on the clutch and brake plates to be monitored and a signal is produced which indicates when such excessive wear has occurred.

The device for achieving this is described in relation to the brake with the associated electro-magnetic coil 51. FIG. 3 shows this coil on an enlarged scale in the ring 42. Adjacent to it is the axially movable but non-rotatable member 73. Upon energisation of the coil 51 the member 73 is attracted towards the coil but is arrested when the clutch plates 71, 72 are in closely packed engagement to transmit braking force. An electrical contact 101 is mounted in a recess in the ring 42 as shown in FIG. 4. This extends beyond the face of the ring 42 towards the adjacent face of the member 73. As wear on the clutch plates 71, 72 occurs these will gradually reduce the distance between the member 73 and the contact 101 upon clutch engagement, until a point will be reached where contact is made between the contact 101 and the member 73.

When the member 73 engages contact 101 a circuit is completed, the current flowing through the contact 101, member 73 through drum 14 to earth.

The contact 101 is connected by means of a wire 103 to a signal producing device which provides a visual or audible signal which this indicates the need for adjustment of the brake.

The signal can, if required, prevent further actuation of the machine until maintenance has taken place.

In the recess 102 a small bridge 104 is used to secure the wire 103 in place, and retain the insulating material which encapsulates the components in their correct positions as shown in FIG. 3.

The wire end is soldered to the contact 101 which is a small rectangular block of electrically conducting material. This may also be of non-magnetic material to prevent small particles of foreign matter bridging the gap.

A similar contact 105 is provided on the other side of the ring 42 adjacent to the electro-magnetic coil 49. This is connected by a wire 106 to the same or another signal producing device and it operates in exactly the same way by contacting the member 57 when the wear on the plates 55, 56 is in excess of a predetermined amount. In this case member 57 is both axially movable and rotatable with respect to coil 49 so that energisation of the coil causes a driving force to be transmitted through gear 24.

A similar contact 107 with associated wire 108 is provided for the clutch adjacent to the electro-magnetic coil 52.

FIG. 5 shows an alternative to the FIG. 3 construction. Fixed in a shallow slot in the external surface of the ring 42 is a holder 109 of generally T-shape. A hole in the upright limb accepts a wire 111 leading to the signal producer. The cross piece contains a flat metallic strip 112 extending beyond the ends of the ring 42 by appropriate amounts equivalent to the contacts 101 and 105 and serving the same purpose. The holder 109 is formed from an insulating material and the strip 112 is embedded in it.

The wires 103, 106 and 108 lead through the block 36 and are contained within the wiring indicated at 26 and emerge through the distributor 27 into the wiring 28.

The arrangement is such that a momentary contact is sufficient to trigger the signal producing device.

As illustrated in FIG. 6(a), a convenient signal producing device 113 includes lamps 114 associated with the clutch and brake mechanisms respectively to provide respective visual signals indicating that maintenance of the associated clutch and brake mechanism is needed. In an alternative arrangement illustrated in FIG. 6(b), a single lamp or an audible signal device 113' is connected to all the clutches and brakes so that actuation of this from any one of the sources, represented by the respective clutches and brakes, indicates to an operator the need for maintenance of the machine. The device of this invention provides protection against damage to the clutch and brake mechanisms in the machine through lack of maintenance or malfunction of a component of the clutch resulting in incorrect operation of these mechanisms.

We claim:

1. A machine tool having a work spindle, an electromagnetic clutch operatively connected to said work spindle, said clutch having releasably frictionally engageable parts, means for adjusting the relative positions of said parts, electromagnetic means for actuating said frictionally engageable parts and including an electromagnet component and an armature component, which components are relatively movable and, in use, are spaced apart by a gap, the width of which is governed by said means for adjusting the relative positions of said frictionally engageable parts, and a clutch protection device comprising an element mounted on one of the components of the electromagnetic means and situated adjacent to the other of the components across said gap, the narrowing of said gap beyond a predetermined value permitting contact between said element and other component, to complete an electrical circuit to produce a signal.

* * * * *